(12) United States Patent
Federico

(10) Patent No.: US 7,662,211 B2
(45) Date of Patent: Feb. 16, 2010

(54) DEHUMIDIFICATION METHOD AND PLANT, PARTICULARLY FOR GRANULAR MATERIALS

(75) Inventor: Critelli Federico, Vigonza (IT)

(73) Assignee: Moretto SpA., Massanzago (Padova) (IT)

( * ) Notice: Subject to any disclaimer, the term of this patent is extended or adjusted under 35 U.S.C. 154(b) by 425 days.

(21) Appl. No.: 11/704,247

(22) Filed: Feb. 9, 2007

(65) Prior Publication Data

US 2007/0199203 A1    Aug. 30, 2007

(30) Foreign Application Priority Data

Feb. 10, 2006    (IT)    .......................... VR2006A0030

(51) Int. Cl.
- *F26B 3/06* (2006.01)
- *F26B 17/14* (2006.01)
- *F26B 21/10* (2006.01)
- *B01D 53/26* (2006.01)

(52) U.S. Cl. ............................... 95/17; 96/112; 96/115; 96/130; 34/80; 34/473; 95/18; 95/123

(58) Field of Classification Search ................... 96/109, 96/112–115, 121, 126–128, 130, 143, 146; 95/14, 17, 18, 90, 117, 121–123, 125, 126, 95/148; 34/416, 472, 473, 80

See application file for complete search history.

(56) References Cited

U.S. PATENT DOCUMENTS

| | | | |
|---|---|---|---|
| 1,559,812 A | | 11/1925 | Trumble |
| 3,448,959 A | | 6/1969 | McHale et al. |
| 3,621,585 A | * | 11/1971 | Robertson .................... 34/375 |
| 3,792,572 A | | 2/1974 | Turbin |
| 3,827,218 A | | 8/1974 | Settlemyer |
| 4,023,940 A | * | 5/1977 | Shultz ......................... 96/112 |
| 4,030,205 A | * | 6/1977 | Robertson et al. ............. 34/380 |
| 4,162,146 A | | 7/1979 | Seibert |
| 4,238,209 A | * | 12/1980 | LaPointe ..................... 96/123 |
| 4,369,048 A | | 1/1983 | Pence |
| 4,509,272 A | * | 4/1985 | Graff ........................... 34/473 |
| 4,656,757 A | * | 4/1987 | Oschmann ................... 34/473 |
| 4,852,851 A | | 8/1989 | Webster |
| 5,485,686 A | * | 1/1996 | Sears, Jr. ..................... 34/473 |
| 5,529,282 A | | 6/1996 | Lebkuchner |

(Continued)

FOREIGN PATENT DOCUMENTS

DE    19719483 A1    11/1998

(Continued)

*Primary Examiner*—Frank M Lawrence
(74) *Attorney, Agent, or Firm*—Orum & Roth LLC

(57) ABSTRACT

The present invention relates to a granular-material dehumidification plant including at least one silo or hopper arranged to receive granular material to be dehumidified at the top thereof and provided with a controlled lower delivering mouth, at least one feeding duct designed to be dipped in the granular material contained in each hopper to supply hot and dry processing air thereto, and at least one exhaust duct for humid processing air; at least two molecular sieve towers arranged alternatively to supply hot and dry processing air to the at least one hopper, each tower delimiting therein a space for housing molecular sieves and a chamber for housing heating means, the space and the chamber being in fluid communication with one another at one end thereof, while being in fluid communication at the other end thereof, with a respective air inlet/outlet duct.

27 Claims, 4 Drawing Sheets

U.S. PATENT DOCUMENTS

| | | |
|---|---|---|
| 5,768,897 A | 6/1998 | Rainville et al. |
| 5,779,768 A | 7/1998 | Anand et al. |
| 5,896,675 A * | 4/1999 | Holler et al. .................. 34/548 |
| 6,729,039 B2 * | 5/2004 | Crawford ..................... 34/343 |
| 2003/0221330 A1 * | 12/2003 | Arnold .......................... 34/58 |
| 2005/0011528 A1 | 1/2005 | Rae |

FOREIGN PATENT DOCUMENTS

| | | |
|---|---|---|
| EP | 0566180 A1 | 10/1993 |
| EP | 0624443 A1 | 11/1994 |
| EP | 0701075 A2 | 3/1996 |
| EP | 1006329 A1 | 6/2000 |
| EP | 1306635 A1 | 5/2003 |
| EP | 1316770 A2 | 6/2003 |
| EP | 1 475 593 | 11/2004 |
| EP | 1475593 A2 | 11/2004 |
| JP | 60114511 | 6/1985 |
| WO | 0238251 A1 | 5/2002 |
| WO | 02081059 A2 | 10/2002 |

* cited by examiner

DEHUMIDIFICATION METHOD AND PLANT, PARTICULARLY FOR GRANULAR MATERIALS

FIELD OF INVENTION

The present invention relates to a flexible-operation dehumidification plant and method for granular materials, particularly suitable for granular materials comprising one or more plastic materials.

In the description of the present invention, the term "granular" refers to both materials in granules and materials in pieces of ground or triturated plastic material, which can include scale pieces, pieces of laminar material, i.e. also pieces with prevailingly plane surfaces.

BACKGROUND OF INVENTION

In plastic material transforming methods, dehumidification is a very important processing to be carried out especially before a melting step of the granular material at high temperature. During the dehumidification treatment, water included in, or otherwise associated to, the granules of the granular material, especially of the so-called "hygroscopic" granular materials, is removed. Removal of any humidity from the granular material is required, since during softening and hot melting of the plastic material water would penetrate the polymer molecular chains, which would result in chain breaking as well as in bubbles, blowholes, and both structural and colouring discontinuity being formed during cooling, thus obtaining a final transformed plastic material with poor mechanical characteristics.

Dehumidification plants for granular materials, also called dehumidifiers or dryers, have already been proposed and among these those providing the use of so-called molecular sieves are the most successful. The molecular sieves have the property of absorbing almost completely the humidity of any air passing therethrough at room temperature. The molecular sieves are contained in a suitable enclosure, called tower, provided with a humid-air inlet, on the one hand, and a dry-air outlet, on the other. The dry air coming from the molecular sieves is heated and then caused to pass through the batch of granular material to be dehumidified, and thus the humidity contained in the granular material is gradually transferred to, and moved away by, the dry and hot air. The duration of the dehumidification process depends on a number of different factors, such as the residual content of humidity, the temperature and the dry-air flow. The humidity-absorption capacity of the molecular sieves is nevertheless quantitatively limited and after a some time saturation is reached. For this reason, a bank of molecular sieves provided in suitable containers or towers, which can be connected in parallel to one another, is used, so that after saturation of the molecular sieves in one tower, the humid air is supplied to another sieve tower, whereas the saturated tower is subjected to a regeneration treatment. Thus, most dehumidification plants often operate with two towers of molecular sieves that work according to an alternating cycle. A dehumidification plant according to the prior art is disclosed in EP-1 475 593 granted to the applicant of the present invention.

Dehumidification plants known up to now, although satisfactory from many points of view, are of "rigid" type, i.e. they do not allow the dry-air flow rate to be changed in accordance with the actual use requirements, and thus treatment steps might take place in which dry heated air is supplied in excess with consequent waste of energy.

SUMMARY OF THE INVENTION

The main object of the present invention is to provide a flexible dehumidification method, i.e. a method making it possible to vary the flow-rate of any dry-air coming from each tower or container of molecular sieves as a function of a predetermined number of operation parameters of the plant.

Another object of the present invention is that said dehumidification method makes it possible to carry out a correct regeneration of each tower of molecular sieves independently from any possible flow-rate variations in the processing air flow.

Another object of the present invention is that said dehumidification method makes it possible to obtain a substantial saving in heat energy.

A further object of the present invention is to provide a dehumidification plant suitable for carrying out the variable flow-rate dehumidification process of the present invention in an optimum way.

According to a first aspect of the present invention, there is provided a granular-material dehumidification plant including at least one silo or hopper arranged to receive granular material to be dehumidified at the top thereof and provided with a controlled lower delivering mouth, at least one feeding duct designed to be dipped in the granular material contained in each hopper to supply hot and dry processing air thereto, and at least one exhaust duct for humid processing air; at least two molecular sieve towers arranged alternately to supply hot and dry processing air to the at least one hopper, each tower delimiting therein a space for housing molecular sieves and a chamber for housing heating means, the space and the chamber being in fluid communication with one another at one end thereof, while being in fluid communication, at the other end thereof, with a respective air inlet/outlet duct; air pressurizing or pumping means arranged to receive, at the suction (inlet) side thereof, humid processing air from a respective exhaust duct, and to feed pressured air, at the delivery side thereof, to each molecular sieve tower; switching-shunting means located between the delivery of the pressurizing means and the inlet/outlet ducts of the housing spaces for molecular sieves thereby switching at least one of the molecular sieve towers between a processing step and a regeneration step; and a programmable electronic control unit. The granular-material dehumidification plant further comprises pressurizing valve means located between the inlet/outlet ducts of the housing chamber of the heating means for each molecular sieve tower and arranged to ensure a minimum pressure within a tower during a regeneration step, and temperature detecting means electrically connected to an input of the programmable electronic control unit.

According to another aspect of the present invention, there is provided a method for regenerating a molecular sieve tower in a dehumidification plant for granular material comprising, in sequence, heating molecular sieves to a temperature of about 300° C., and cooling said molecular sieves, characterized in that said cooling comprises controllably mixing air in the tower to be cooled with processing air coming from another molecular sieve tower, said mixing being controlled through said switching/shunting means in response to the temperature detected by temperature detecting means.

BRIEF DESCRIPTION OF THE DRAWINGS

Further features and advantages of the present invention will better appear from the following detailed description given by way of non-limiting example of carrying out the invention, taken together with the accompanying drawings, in which.

DETAILED DESCRIPTION OF THE PREFERRED EMBODIMENTS

Figure 1:
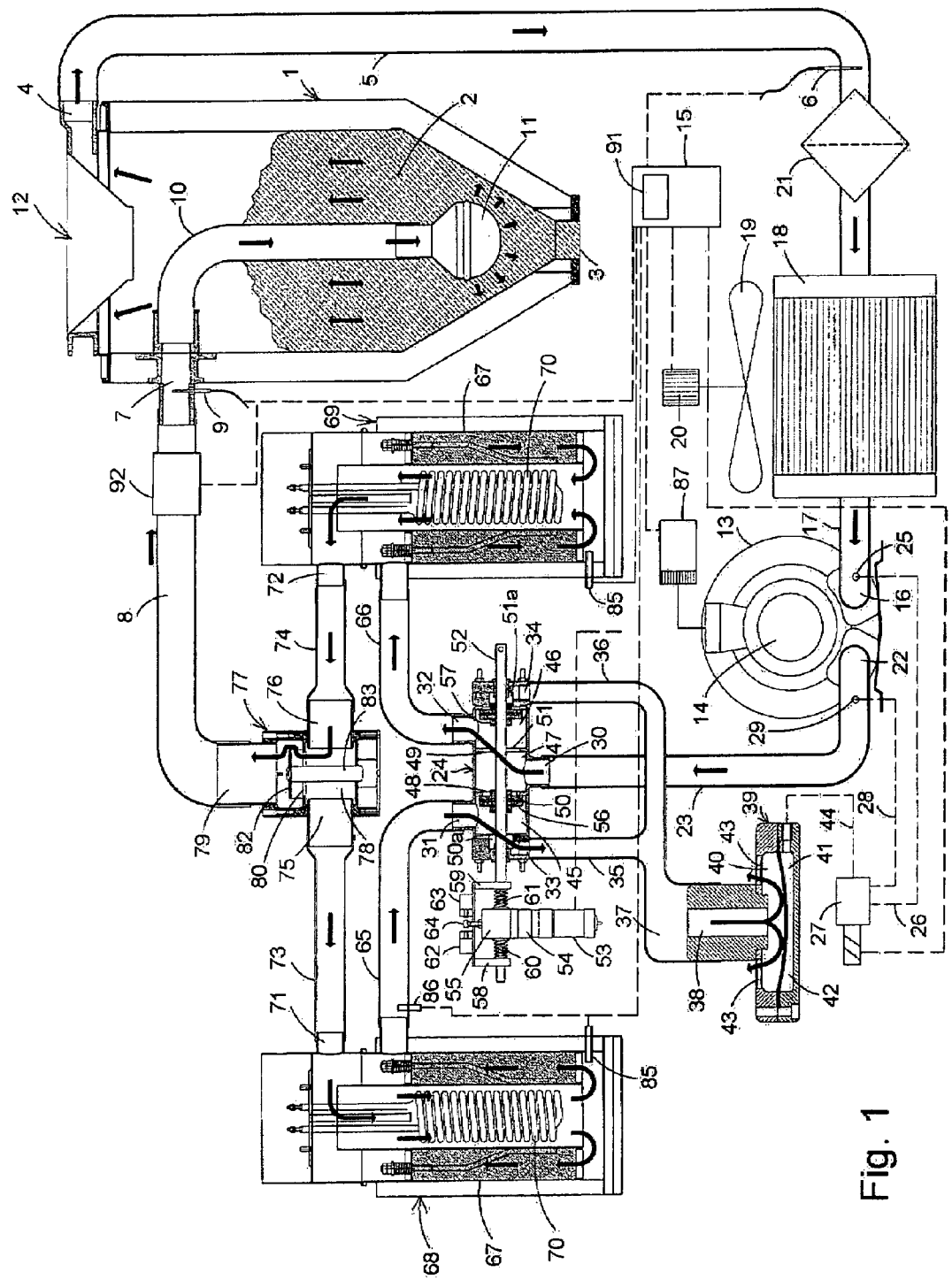
FIG. 1 illustrates a diagrammatical view of a variable flow-rate dehumidification plant having two towers according to the present invention with components shown in cross-section for clarity.

With reference to the above listed Figures, it will be noted that a dehumidification plant according to the present invention comprises one or more silos or hoppers 1 designed to contain a bulk of granular material 2 to be dehumidified. Each hopper 1 has a bottom provided with wall or walls that are tilted toward a lower exhaust mouth 3 for granular material 2, with the lower exhaust mouth 3 being suitably controlled by a batching device or extractor (not shown) of any suitable type as it is well known in the art. Each silos or hopper 1 is closed at the top thereof and has an outlet mouth 4, which directly communicates with one end of an air exhaust duct 5, in which is preferably located a heat probe 6. Each hopper or silo 1 also has a dry air inlet mouth 7, which is preferably formed in its side wall above the level of the granular material 2 contained therein, and is externally in direct communication with a dry-air feeding duct 8, in which a heat probe 9 is provided, whereas it is internally in direct communication, e.g. with a length of a crank pipe 10 extending into the granular material 2 and ending at the lower portion, i.e. close to and above the exhaust opening 3, with a diffuser 11 having a plurality of air outlet openings formed in a hollow partly spherical body, so as to direct a multiplicity of jets to a plurality of directions at the lower area of the granular material to be dehumidified contained in the hopper. During operation of the plant, the or each hopper or silo 1 is continuously loaded from the top with cold granular material 2 by means of a loading device generally indicated with the reference numeral 12 and of any suitable type.

Preferably, a measuring means suitable for measuring the flow-rate of the air entering the hopper 1 is provided in the hot and dry air feeding duct 8, e.g. a Venturi tube 92 provided with a respective differential pressure sensor (not shown and of any suitable type, e.g. as illustrated and described in the Italian patent application VR2005A000128 to the applicant of the present application), electrically connected to the electronic control unit 15.

The dehumidification plant also includes air pressurizing or pumping means, e.g. comprising one or more blowers 13 driven by a respective electric motor 14, and an electronic program control unit 15, including a microprocessor, as it is known in the art and designed to control each blower 13, as well as other components of the plant, as described below. A suction mouth 16 of each blower communicates with an air inlet duct 17 connected to the outlet of cooling means 18 comprising an assembly or group of tubes connected in parallel and subject to the action of a fan 19 that can be operated by a respective electric motor 20. The cooling battery 18 receives, in turn, at the inlet thereof, air coming from the air exhaust duct 5, preferably after the same has flown through a filtering assembly 21 of any suitable type. The delivery side 22 of each blower 13 communicates with a delivery duct 23 designed to supply pressurized air to switching-shunting valve means, e.g. a slide shunting or distribution valve assembly 24 of any suitable type. In the inlet air duct 17 a depression intake 25 is provided, which communicates through a duct 26 with a differential pressure detecting means, e.g. a solenoid valve 27 electrically connected to the board or unit 15 and whose operation will be explained below. The electrovalve 27 also communicates, via a duct 28, with a pressure intake 29 provided in the delivery duct 23.

The valve assembly 24 is provided with a valve body having an inlet 30, two main inlets/outlets 31, 32, and two secondary outlets 33 and 34, the first secondary outlet 33 being located at the side of the inlet/outlet 31, whereas the other outlet 34 is located at the side of the inlet/outlet 32. The two secondary outlets 33 and 34 communicate, through a respective duct 35 and 36, with a common manifold 37, which communicates with an inlet 38 of controllable cutting off means, preferably comprising a diaphragm valve 39 delimiting an inner chamber divided in two compartments 40 and 41 by a diaphragm 42 which preferably acts in response also to low working pressures and withstands temperatures of the order of 220-260° C. or higher.

Figure 2:
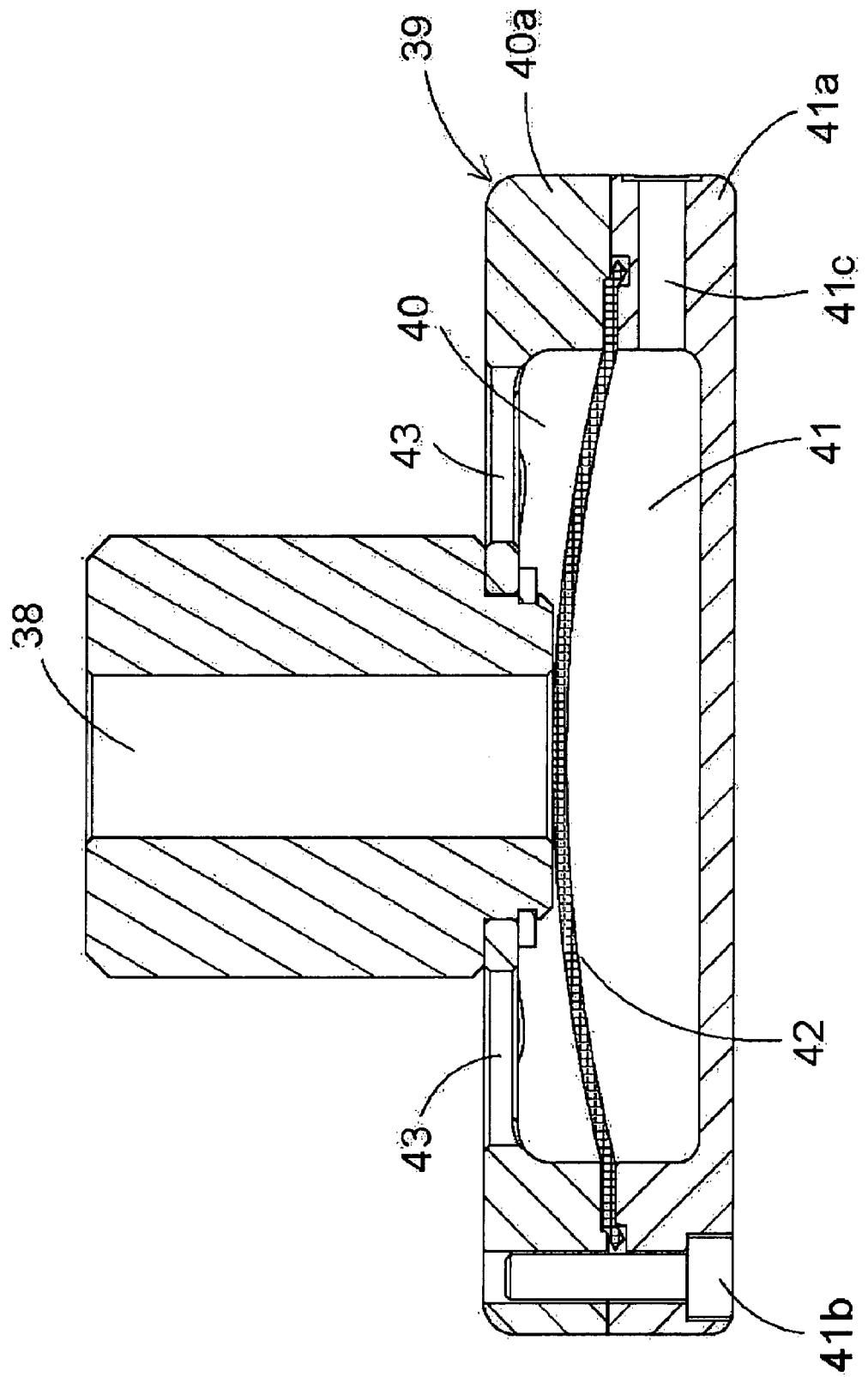
FIG. 2 shows a detail of FIG. 1 concerning a diaphragm valve on an enlarged scale, but in a different operational condition.

As better illustrated in FIG. 2, the body of diaphragm valve 39 is preferably formed by two shells 40a and 41a fixed together by means of a plurality of peripheral bolts 41b, the diaphragm 42 being located therebetween, which also ensures airtight sealing between compartments 40 and 41. The compartment or chamber 40 communicates with the atmosphere or an external hot-air recovery system through openings 43 provided in the shell 40a, whereas the compartment 41 communicates with the output of the solenoid valve 27 through a hole 41c and a duct 44.

With this structure, should the compartment 41 be pressurized by means of the solenoid valve 27 by supplying pressurized air through the duct 44, the diaphragm 42 is caused to bend towards the shell 40a and close the air inlet 38 (FIG. 2). On the contrary, should the compartment 41 be depressurised by means of the solenoid valve 27, the diaphragm moves away from the air inlet 38 and air can enter the valve 39 and be exhausted to the external ambient through openings 43. The pressure/depression needed for driving the diaphragm 42 is preferably very low, e.g. in the order of 20-30 mbar, and is supplied by the blower 13 through the pressure intake 28 and duct 28, or the depression intake 25 and duct 26.

Figure 3:
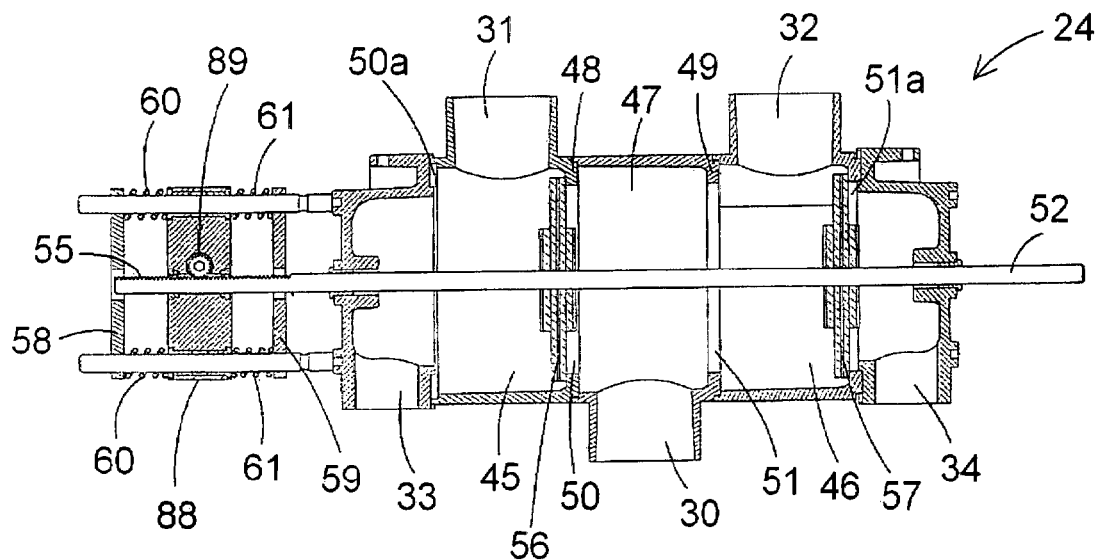
FIG. 3 is a cross-sectional view on an enlarged scale of a slide valve shown in FIG. 1.
Figure 4:
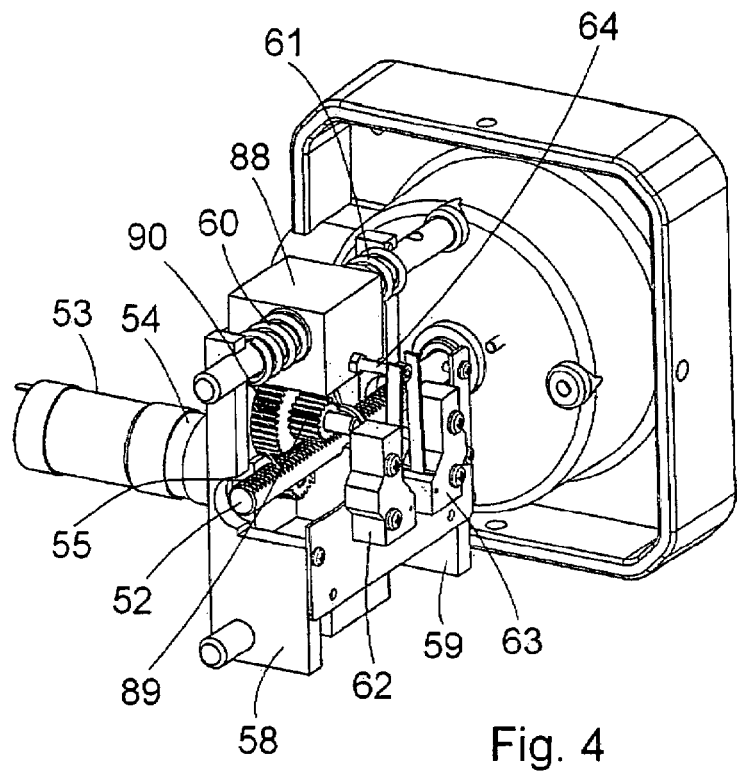
FIG. 4 is a perspective view with cut-away portions of a driving assembly of the slide valve of FIG. 3.

As better illustrated in FIGS. 3 and 4, the slide valve assembly 24 delimits three inner chambers: two side chambers 45 and 46, and an intermediate chamber 47, due to the presence of two partitions 48 and 49, preferably two plane and parallel partitions, each having a through opening 50 and 51, respectively, the openings 50 and 51 being aligned to one another. The side chambers 45 and 46 also have a respective opening 50a and 51a formed in the body of the valve assembly 24 for communication with a respective duct 35 and 36, whereas the intermediate chamber 47 communicates with duct 23. The openings 50, 50a and 51, 51a are loosely crossed by a rigid rod 52, which extends out of the valve body of the valve assembly 24, and thus it has one end thereof projecting from the valve body in order to be connected to control means comprising a linear driving device, e.g. comprising a gearmotor, which includes a reversible electric motor 53, and a reduction gear 54 of any suitable type, and a rack 55 formed at the end of the rigid rod 52 extending out of the valve body and operatively connected to the gear motor by means of a further gear reduction assembly, in the example of FIG. 4 two toothed wheels 89, 90.

The rigid rod supports a pair of shutters: one shutter 56 within the chamber 45 arranged to open and close opening 50 in the partition 48, on the one hand, and opening 50a, on the other, the other shutter 57 being arranged to open and close opening 51 on the partition 49, on the one hand, and opening 51a, on the other. The arrangement of the shutters on the rigid rod 52 is such that, when the shutter 56 closes the opening 50 and leaves the opening 50a open, the shutter 57 leaves the opening 51 open and closes the opening 51a, whereby the slide valve assembly 24 has two end portions and a number of intermediate portions, as will be further described below.

To this end, on opposite side with respect to the rack 55, the rod 52 has two stops 58 and 59 fixed thereto. Against each stop one end of a respective resilient loading means, typically two pairs of compression or extension springs 60 and 61, abuts, the other end of which abuts against a fixed element with respect to the rod 52, e.g. the fixed casing 88 of the gears 89 and 90, so that when the rod 52 is pushed by the rack to move in one direction it loads one of the springs 60 and 61, whereas when it is moved in the opposite direction it loads the other spring. The two stops 58 and 59 support a pair of micro-switches 62 and 63 arranged to abut against a fixed intermediate contact 64, e.g. carried by the casing of the gearmotor, in order to stop the reversible motor 53 at one of the two end working positions of the shutters 56 and 57. The function of the compression springs 60 and 61 is that of ensuring that the rigid rod 52 is permanently kept in pushing or pulling condition so as to keep the shutters, or better their respective seals, well pressed against the partition walls 48 and 49.

The two main inlets/outlets 31, 32 communicate with a respective duct 65, 66 in communication with a peripheral annular chamber or space housing the molecular sieves 67 of a respective dehumidifying tower 68, 69 of the type described in the above mentioned previous patent EP-1 475 593 to the applicant. In the annular chamber or space containing the molecular sieves 67 an inner chamber is delimited for housing heating means or a heat source (typically one or more electric resistors 70) designed to exchange heat with the air passing through the inner chamber. The annular and the inner chambers or spaces communicate one with another at one end thereof (below), whereas at their other end, they communicate with a respective air inlet/outlet duct, as described below.

At the top of each dehumidifying tower 68, 69 there is provided an air inlet/outlet, 71, 72 respectively, which, inside the respective tower, communicates only with the inner chamber housing the heat source, whereas it communicates outside with one end of a respective duct 73 and 74, whose other end communicates with a respective inlet/outlet 75, 76 of valve means comprising a pressurizing valve 77 located on the delivery side 8 of hopper 1. The pressurizing valve 77 has the function of ensuring a minimum pressure at low flow-rates and avoiding at the same time an excessive pressure loss at the high flow-rates during the regeneration step of one of the towers 68, 69.

Figure 5:
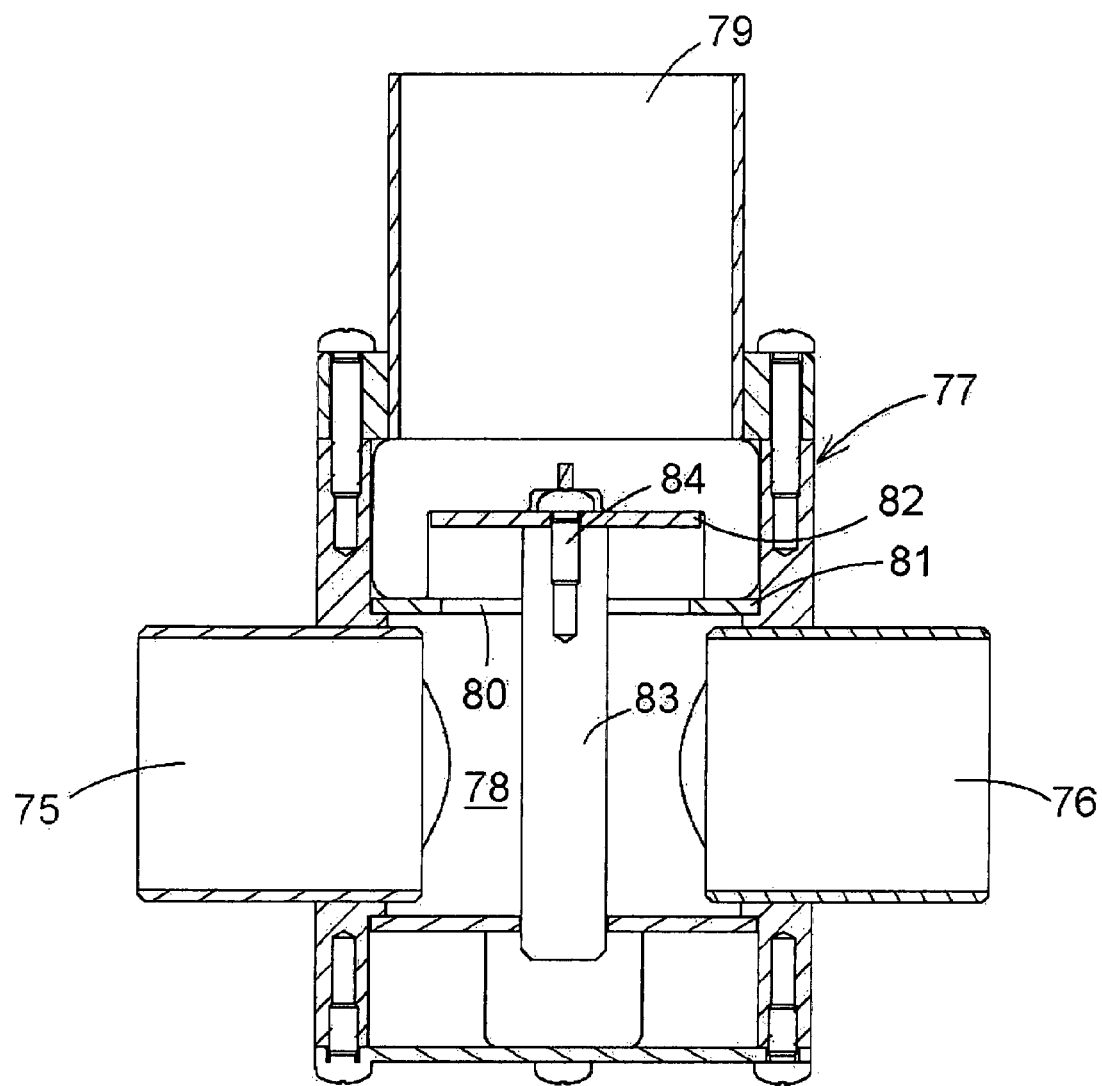
FIG. 5 illustrates a cross-sectional view on an enlarged scale of a pressurizing valve shown in FIG. 1.

As illustrated in more detail in FIG. 5, the pressurizing valve 77 delimits an inner chamber or space in direct communication with the inlets/outlets, whereas it can communicate with a top outlet 79 through an opening 80 provided in a partition wall 81 and controllable by a shutter means 82. The outlet 79 is, in turn, in communication with duct 8 for feeding dry air to the hopper 1.

The shutter 82 is supported by a rod or pin 83 slidingly mounted in any suitable way in a substantially vertical direction within the chamber 78. Preferably, the shutter 82 is mounted at the top of pin 83 by means of a securing screw 84 screwable into the head of pin 83, and the pin-shutter-securing screw assembly forms an integral unit moving as a whole and having a predetermined weight. With this structure of the pressurizing valve, the air pressure within chamber 78 at the opening 80 exerts a force opposite to the weight of the pin-shutter-screw assembly. When the air pressure is such that the shutter is caused to lift, e.g. 7-10 mbars, air can also flow through the opening 80 to the outlet 79 and duct 8.

If desired, the shutter means 80, instead of operating by gravity, can be resiliently loaded in any suitable way, e.g. by means of one or more gauged springs, not shown in drawings.

The operation of the above described plant will be explain below with reference to a plant with two dehumidifying towers, as illustrated in FIG. 1, although one or more than two of dehumidifying towers can be provided.

In the diagram illustrated in FIG. 1, hot and dry air from the dehumidifying tower 69 is supplied to hopper 1, while regeneration tower 68 is undergoing a regeneration cycle of the molecular sieves 67. The electrical resistor 70 heats the air supplied through duct 73, and a heat probe suitably connected to an electronic control unit 15 is arranged to control current supply to the electrical resistor 70 in order to maintain the temperature of the air heated in the tower at about 300° C., before flowing through the molecular sieves 67. The heated air crosses the molecular sieves 67 from bottom upwards, thus regenerating them, and is then discharged into the duct 65 carrying away with it any humidity removed from the molecular sieves. In duct 65 there is also provided a heat probe 86, arranged to detect the temperature of the air coming out of the regeneration tower 68, and, should such a temperature reach a predetermined value, a control input signal is applied to the electronic control unit 15, thereby cutting off the current supply to the air heating resistor 70. At this point, a cooling step of tower 68 is started.

The duct 65 supplies air loaded with humidity coming from the tower 68 to the inlet 31 of the slide valve assembly 24, which, in the illustrated working condition, i.e. with the shutter 56 closing the opening 50, and the shutter 57 closing the opening 51a, causes the air flow to divert through the side chamber 45 towards duct 35, and thus to reach inlet 38 of the diaphragm valve 39. The air enters the compartment 40 through inlet 38, and is discharged outside through openings 43. The compartment 40, owing to the action of the controlled-pressure diaphragm opposite arranged in the compartment 41, is continuously gauged, thereby assuring that a controlled amount of humid regeneration air flows therethrough. Until a depression condition maintained in the compartment 41, the inlet 38 is in communication with the openings 43, and such a condition is maintained during both the regeneration air heating step and the subsequent cooling operation of the dehumidification tower while being regenerated.

Once the regeneration of the tower 68 is ended, should the other tower 69 that is carrying out a processing-air dehumidifying step not be saturated with humidity yet, the diaphragm valve 39 is closed, i.e. the electrovalve or solenoid valve 27 is operated by the control unit 25 to be switched so as to feed pressurized air to the compartment 41, which results in the diaphragm 42 being pushed against the light of inlet 38, thus closing it (FIG. 2), whereby "cutting off" the regenerated tower 68 from the remaining components of the plant.

Clearly, while the tower 68 is regenerated or cut-off, the other tower 67 continuously carries out dehumidification of the processing air to be fed to hopper 1. More precisely, the processing air coming from the delivery duct 23 of the blower 13 enters the intermediate chamber 47 of the valve group 24, flows through the opening 51, which is now free, enters the duct 66 and then the peripheral annular chamber housing the molecular sieves 67 in the tower 69. Once the processing air has entered the tower 69, it flows through the molecular sieves from the top of the tower downwards and transfers its humidity content to the sieves. The air temperature is then checked by the heat probe 85 located at the bottom of the tower, and the dehumidified processing air rises along the inner chamber of the tower, where it is heated by the resistor 70 provided therein, and comes out dry and hot at the top through the outlet 72 and the duct 74 to reach the inlet 76 of the pressurizing valve 77.

The pressurizing valve 77 has the specific task of ensuring that a minimum pressure, e.g. 7-10 mbar, is maintained in the ducts 73 and 74 to guarantee a constant supply of dry air during the regeneration process in the regeneration tower, the tower 68 in the situation illustrated in FIG. 1.

The air flowing through the outlet 79 of the pressurizing valve 77 along the duct 8 is supplied to the diffuser 11, thereby flowing through the bulk of granular material stored in the hopper 1 and then coming out while being sucked by the blower 13 through the duct 5, the filter 21, and the cooling battery 18.

When the tower 69 becomes saturated, the role of the towers has to be inverted. To this end, the control unit 15 will apply an output control signal to the motor 53 thereby causing the slide valve assembly 24 to changes its operational condition, i.e. the shutter 56 is moved in order to open the opening 50 and close opening 50a, whereas the shutter 57 will open the opening 51a and close opening 51, in the mean time the spring 61 being compressed until the microswitch 63 abuts against the fixed contact 64. As a result of the new operational position of the valve assembly 24, the regenerated tower 68 will be set into communication with the delivery side of the blower 13 through the chamber 47 and the opening 50, and thus dry and hot processing air is supplied to the tower 1 through the pressurizing valve 77.

When designing a conventional dehumidification plant, it was a standard to take into account the flow rate of dehumidified material required to feed one or more processing machines, typically injection presses and/or extruders, at a maximum output rate of the same. As a function of such a flow rate, typically expressed in kg/h, of granular material to be processed, and the time required for dehumidifying the same, one used to determine the granular material storage and feeding capacity of a hopper. Also the flow rate of dry and hot air fed by the hopper was conventionally determined as a function of the maximum flow rate of granular material that could be fed to a processing machine and due account was taken of the most difficult material to be dehumidified, e.g. the most hygroscopic material. As a result, there was a clear trend to oversize the conventional dehumidification plants.

Dies in injection presses are normally fed with a granular material amount lower than that corresponding to the maximum flow rate (in terms of quantity of injectable material) of the processing machine. Thus, for example, for moulded pieces having a thin wall and/or a wide surface, it is necessary to use a large press, a great force for closing the dies being required. Nevertheless, only a small percentage of the maximum flow rate of the granular material, which could be injected into the press, is used. Conventional injection presses available on the market are thus suitable for being adapted to the real moulding requirements with substantial saving of energy.

On the contrary, conventional granular material dehumidification plants designed to supply injection presses are rigid, in the sense that they cannot adapt themselves to any change in the granular material supply to a downward processing machine. For this reason, conventional dehumidification plants always feed the same amount of granular material and dry and hot air in the time unit, such amounts being set during the plant calibration step, which results in a high consumption of energy that generates heat stress in the granular material being processed owing to an excessively long time interval in which the material remains exposed to relatively high temperature due to a decreased drawing of material being effected and a too high flow rate of hot air being held.

A dehumidification plant according to the present invention, unlike the conventional plants, is a flexible system, i.e. it is suitable for conveniently control and adjust a great number of variables, i.e. in particular: the specific air flow rate, the air flow rate, the production in the time unit, and the stay time of the granular material in the hopper 1, depending upon the variations of the operation conditions of the downward processing machine(s).

In the present document, the specific air flow rate indicates the amount of hot and dry air which has to be supplied per each kilogram of granular material to be dehumidified. Thus, for example, a specific air flow rate of 2 $m^3$/kg means that 2 $m^3$ of air are supplied per kilogram of a given granular material to be dehumidified, e.g. ABS (acrylonitrile-butadiene-styrene).

The production in the time unit means the required flow rate per hour expressed in kg/hour of plastic granular material to be dehumidified. To determine such a variable, it necessary to consider the consumption per hour of granular material by the maximum size die that can be used in the injection press. In order to calculate the required air flow rate, one has to multiply the above defined production by the specific air flow rate for that specific given material to be dehumidified. Thus, for example, if for a given processing machine the hourly consumption of granular material is of 30 kg/h, to which a specific air flow rate of 2 $m^3$/kg corresponds, it will be necessary a flow rate per hour of dry and hot air of 30 kg/h×2 $m^3$/kg=60 $m^3$/h.

A dehumidification plant according to the present invention is thus provided with means which are suitable for varying the speed of rotation of the blower 13, controlled by the electronic control unit 15, and make it possible to vary the flow rate of the air coming from the blower 13. Such a means arranged to vary the rate of the blower is preferably of mechanical-type, e.g. a speed variator, and more preferably of electronic-type, e.g. an inverter 87 of any suitable type designed to vary the frequency of the current supplied to the motor 14 of the blower 13. Owing to the presence of the inverter 87, the dehumidification plant can operate in a flexible way, thereby adapting itself above all to the requirements of a smaller consumption of granular material in the time unit, which makes it possible to achieve substantial saving in heat energy.

To this end, in a first portion of memory of the control unit 15 a table is stored, which includes a list of a first multiplicity of granular plastic materials together with respective main processing parameters that could to be used in the plant. In a second portion of the memory of the control unit it will be also possible to store experimentally obtained processing parameters and characteristic features concerning further materials (experimental materials).

Once a specific granular material to be dehumidified among those listed in the table or an experimental material, as well as the hourly consumption of dried granular material to be fed by the hopper 1 to be supplied to one or more processing machines (consumption) placed downwards of the dehumidification plant has been selected, the control unit 15 will automatically reckon and store in the table the required air flow rate, i.e. the specific air flow rate associated to a specific granular material available in the hopper 1, and consequently the frequency of the current supplied to the electric motor 14 designed to operate the blower 13.

Venturi tube 92 provided in the feeding duct 8 for supplying hot and dry air to the hopper 1 will measure the inlet flow rate to the hopper 1 and apply an input signal to the control unit 15, which in turn will modulate the air flow rate at the delivery side of the blower 13 to adapt it to the actual request and as provided for that specific granular material.

Advantageously, to assist the operator that supervise a dehumidification plant according to the present invention in carrying out the selection operations of the already stored materials and the operation parameters of the plant, as well as in storing new materials to be dehumidified, the dehumidification plant is provided with a user interface 91, that typically comprises a display unit and data input means, e.g. a keyboard and a mouse. Preferably, the user interface is a graphical object interface of a touch-screen type located in a plant component or in the vicinity of the dehumidification plant, or in a remote control position.

In addition, it often happens that the consumption of dehumidified material from the hopper 1 undergoes drastic decreases, or even interruption, and thus the preset air flow rate of the blower 13 is then excessive. To obviate to such a drawback and permit further energy saving a probe 6 is provided in the air discharge or return duct 5. Normally, during the continuous operation of the dehumidification plant, relatively cold granular material (at ambient temperature) is continuously loaded to the top of hopper 1 by means of the loading device 12, which causes a decrease in the temperature of the air coming out of the hopper 1. When instead the delivery of granular material from the hopper 1 is reduced or cut off, the supply of fresh granular material to the hopper is also reduced or cut off, and thus the temperature of the air discharged into the duct 5 starts increasing. Such temperature change is detected by probe 6, which generates control signals proportional to the detected temperature increase and applied them to the control unit 15, which in turn will process and generate respective control signals for the inverter 87. As a result, the outlet flow rate to the blower 13 will be correspondingly reduced, with consequent energy saving.

Advantageously, it is also possible to set a initial heating ramp for the granular material to prevent a heat shock from being caused, especially when dealing with plastic materials requiring high processing temperatures, as well as a ventilated cooling ramp, for the case in which an extended interruption in the granular material supply to, or delivery from hopper 1, e.g. over the week-end.

During the regeneration process of a molecular sieve tower two steps are to be distinguished: a first step during which the molecular sieves 67 are heated to about 300° C., and a second step in which the regenerated molecular sieves are cooled down in order to make them suitable for being re-used. Cooling is required both for ensuring a correct adsorption during dehumidification, and avoiding too high outlet temperatures. As a matter of fact, if a not cooled regenerated tower is used to carry out an air dehumidification operation, an outlet temperature of the order of 220-250° C. is obtained, which is to be considered as noxious for the granular plastic material. On the other hand, cooling up to now meant dispersing heat energy at a rather high temperature level and causing humid air to flow throughout a just regenerated tower, thus pre-loading or "polluting" the molecular sieves 67.

The solution of this problem is the provision of a valve switching assembly 24, preferably a slide-type valve, in which mixing of air coming, through the hopper 1 and the blower 13, from a relatively cold processing tower, e.g. tower 69, with hotter air coming from a just regenerated tower to be cooled is carried out, so as to generate an air flow rate at a mean temperature (slightly) lower than the processing temperature. The resistor(s) 70 in the processing tower 69 will then heat the air coming from the valve assembly 24 to the correct temperature value.

The way in which mixing occurs out can be either continuous or pulsating. In the continuous way, the electrical motor 53 controlled by the control unit 15 causes the rod 52 and then the shutters 56 and 57 to move in a slow and accurate way in response to the temperature detected by the probe 9 at the processing air inlet 7 to the hopper 1 until an equilibrium position is reached that maintains the temperature ad a predetermined value. In such conditions, the air coming out of the regenerated tower 68 through conduit 65 and that entering the processing tower 69 along conduit 66 flows at different flow rates determined by the slide valve assembly 24. Dry processing air from the pressurizing valve 77 is fed to the relatively hot regenerated tower 68 at the same time.

In the pulsating mode the motor 53 causes the shutters 56 and 57 to move through a given length and then stops until the temperature increase detected by the probe 9 results in a control signal being generated and applied to the electronic unit 15 that will cause the motor 53 to rotate backwards to the closed position and until the temperature detected by the probe 9 is decreased again.

Once the temperature of the tower being cooled (tower 68) has lowered below the processing air temperature plus a predetermined ΔT (e.g. 25° C.), the cut off condition of the tower is terminated by closing the diaphragm valve 39 until the slide valve assembly 24 is switched over again, which will result in a switching of the functions, i.e. tower 69 is set in a regeneration stage and regenerated tower 68 in a processing stage. By stopping any further cooling of the regenerated tower the cooling time of the tower is shortened and a substantial heat energy is saved as any heat energy in excess is almost completely recovered.

When one consider that with an air temperature up to 60° C. at the inlet of a processing tower the dew point is kept at about −65° C., there is provided that that the electronic unit 15 controls the motor 20 of the blower 19 for the cooling assembly 18 in such a way that any air in the air inlet duct 66 or 65 to a processing tower is at a temperature of about 60° C. In this way, the subsequent heating due to the electric resistor(s) 70 will be less costly in terms of heat energy.

With the above described structure of a variable flow rate dehumidification plant according to the present invention it is possible to vary the production interval or range with respect to a conventional dehumidification plant of about 30% of its upper limit and of about 50% of its lower limit. Thus, for example, a 100 m$^3$/h dehumidification plant according to the present invention can automatically vary its air flow rate from 100 to 50 m$^3$/h at the beginning of production and/or increase up to 130 m$^3$/h in case of higher production requests.

Should a dehumidification plant according to the present invention be designed to feed a plurality of hoppers connected in parallel to each other and each equipped with a respective measuring system for detecting the dehumidification air flow rate, e.g. as disclosed in the Italian patent application VR2005A000128 in the name of the applicant of the present application, the total air flow rate that the plant is to deliver will be equal to the addition of the air flow rates required by the single towers.

The invention as described above is susceptible to numerous modifications and variations within the scope as defined by the claims.

The invention claimed is:

1. A granular-material dehumidification plant including
   at least one silo or hopper arranged to receive granular material to be dehumidified at the top thereof and provided with a controlled lower delivering mouth,
   at least one feeding duct designed to be dipped in the granular material contained in each hopper to supply hot and dry processing air thereto, and
   at least one exhaust duct for humid processing air;
   at least two molecular sieve towers arranged alternately to supply hot and dry processing air to said at least one hopper, each tower delimiting therein a space for housing molecular sieves and a chamber for housing heating means, said space and said chamber being in fluid communication with one another at one end thereof, while being in fluid communication, at the other end thereof, with a respective air inlet/outlet duct;
   air pressurizing or pumping means arranged to receive, at the suction (inlet) side thereof, humid processing air from a respective exhaust duct, and to feed pressured air, at the delivery side thereof, to each molecular sieve tower;
   switching-shunting means located between the delivery of said pressurizing means and said inlet/outlet ducts of said housing spaces for molecular sieves thereby switching at least one of said molecular sieve towers between a processing step and a regeneration step; and a programmable electronic control unit,
   wherein it comprises pressurizing valve means located between said inlet/outlet ducts of said housing chamber of said heating means for each molecular sieve tower and arranged to ensure a minimum pressure within a tower during a regeneration step, and temperature detecting means electrically connected to an input of said programmable electronic control unit.

2. A plant as claimed in claim 1, wherein said pressurizing valve means comprises an inner chamber in direct fluid communication with said inlet/outlet ducts and with an outlet to at least one feeding duct through an opening controllable by shutter means, whereby being controllably opened/closed as a function of the pressure within said inner chamber.

3. A plant as claimed in claim 2, wherein said shutter means is supported by a rod or pin slidingly mounted in a substantially vertical direction in said inner chamber, thereby being opened and closed by gravity owing to air pressure variations in said chamber.

4. A plant as claimed in claim 3, wherein said shutter means is resiliently loaded in a controlled way, thereby opening and closing proportionally to the pressure within said inner chamber.

5. A plant as claimed in claim 1, comprising cutting off means which is in communication with at least one exhaust duct from said switching-shunting means, and controllable by a detecting means designed to detect pressure differential between suction side and delivery side of said pressurizing means.

6. A plant as claimed in claim 5, wherein that said cutting off means comprises a diaphragm valve, whose diaphragm delimits two inner compartments, a compartment communicating with at least one exhaust opening, whereas the other is in fluid communication with said pressure differential detecting means.

7. A plant as claimed in claim 5, wherein said pressure differential detecting means comprises a solenoid valve having two inlets in fluid communication with said suction side and said delivery side, respectively, of said air pressurizing means, and its outlet in fluid communication with said compartment.

8. A plant as claimed in claim 5, wherein said switching-shunting means comprises a slide valve assembly, and driving means for said slide valve assembly designed to drive it both in a continuous and pulsating way.

9. A plant as claimed in claim 6, wherein said slide valve assembly comprises a valve body delimiting therein two side chambers and an intermediate chamber which communicate with each other through openings, said intermediate chamber communicating with the delivery side of said air pressurizing or pumping means, whereas said side chambers communicate with both a respective air inlet/outlet duct and a respective exhaust opening to said cutting off means, and a rigid rod, which extends through said side and intermediate chambers, supports a pair of shutter means fixed thereto and designed to open-close said openings, and extends outwardly from the valve body thereby operatively engaging with said driving means.

10. A plant as claimed in claim 9, wherein said driving means comprises a reversible linear actuator means including a reversible electric motor controllable by an electronic program control unit and a reducer, and a rack operatively connected to said reducer and rigid with said rod.

11. A plant as claimed in claim 10, wherein said linear actuator means comprises two spaced stops secured to said rigid rod, a resilient loading means for each stop arranged to abut against a fixed member with respect to said rigid rod, a pair of micro-switches carried by the rigid rod and designed to abut against an intermediate contact fixed with respect to the rigid rod and arranged to stop said reversible motor at two working positions of said shutters.

12. A plant as claimed in claim 1, comprising cooling means designed to cool the air flowing through said at least one exhaust duct for humid processing air fed to said air pressurizing means.

13. A plant as claimed in claim 12, wherein said cooling means comprises an assembly of pipes connected in parallel to each other and subject to the action of at least one fan means drivable by a respective electric motor.

14. A plant as claimed in claim 1, comprising a heat sensing probe arranged to detect the temperature of the air coming out of a regeneration tower, and electrically connected to said electronic program control unit.

15. A plant as claimed in claim 1, wherein said electronic program control unit comprises a first memory portion designed to store processing parameters concerning a first multiplicity of granular materials, and a second memory portion designed to store processing parameters of experimental materials.

16. A plant as claimed in claim 1, comprising a user interface with said electronic program control unit.

17. A plant as claimed in claim 16, wherein said user interface comprises a display unit, and data input means for applying data to said electronic program control unit.

18. A plant as claimed in claim 17, wherein said display unit is of touch-screen type.

19. A plant as claimed in claim 1, comprising adjusting means controlled by said electronic program control unit and designed to adjust the flow-rate of the air coming out of said pressurizing and pumping means.

20. A plant as claimed in claim 19, wherein said adjusting means for the flow-rate of the air coming out of said pressurizing and pumping means comprises an inverter.

21. A plant as claimed in claim 1, comprising sensing means for measuring the air flow-rate entering the hopper which is electrically connected to said electronic program control unit.

22. A plant as claimed in claim 21, wherein said flow-rate measuring means comprising a Venturi tube.

23. A method for regenerating one molecular sieve tower in a dehumidifying plant for granular material as claimed in 1, comprising, in sequence, heating molecular sieves to a temperature of about 300 degrees C., and cooling said molecular sieves, characterized in that said cooling comprises controllably mixing air in the tower to be cooled by means of processing air coming from another molecular sieve tower, said mixing being controlled by said switching-shunting means in response to the temperature detected by said temperature detecting means.

24. A method as claimed in claim 23, wherein said mixing through said switching-shunting means is carried out in a gradual pulsating way.

25. A method as claimed in claim 24, wherein said tower to be cooled during the mixing step is isolated from the outside by cutting off means.

26. A method as claimed in claim 23, comprising a standby step for said tower to be cooled when cooling thereof is terminated.

27. A method as claimed in claim 23, comprising a hot and dry air flow-rate modulating step in said air pressurizing or pumping means controlled by said electronic program control unit.

* * * * *